T. F. HARKINS.
PULP FEEDER.
APPLICATION FILED NOV. 25, 1912.
1,081,737.
Patented Dec. 16, 1913.
2 SHEETS—SHEET 1.
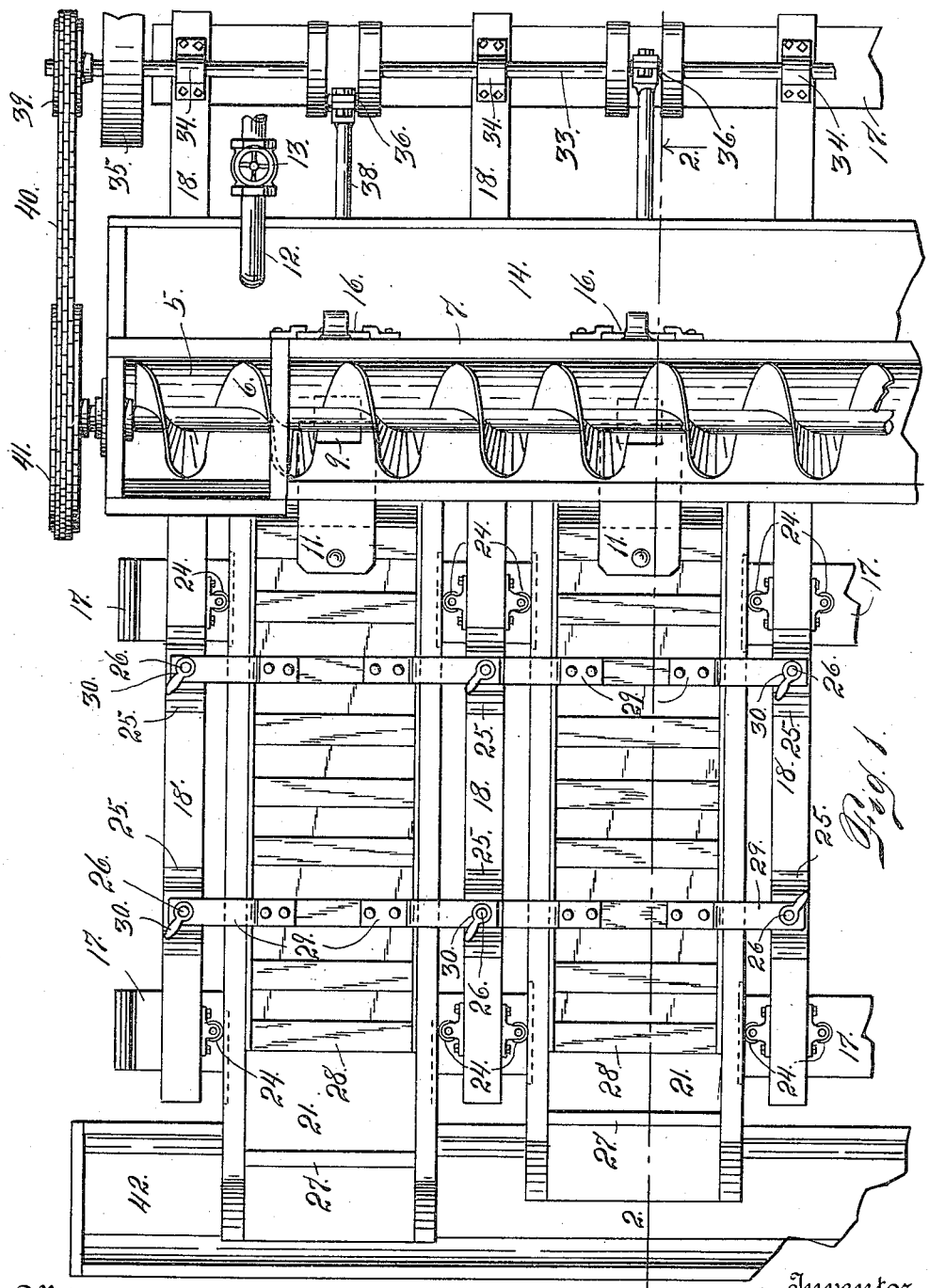
Witnesses
Solon J. Boughton.
C. H. Rossner.
Inventor
Thomas F. Harkins.
By N. J. O'Brien
Attorney

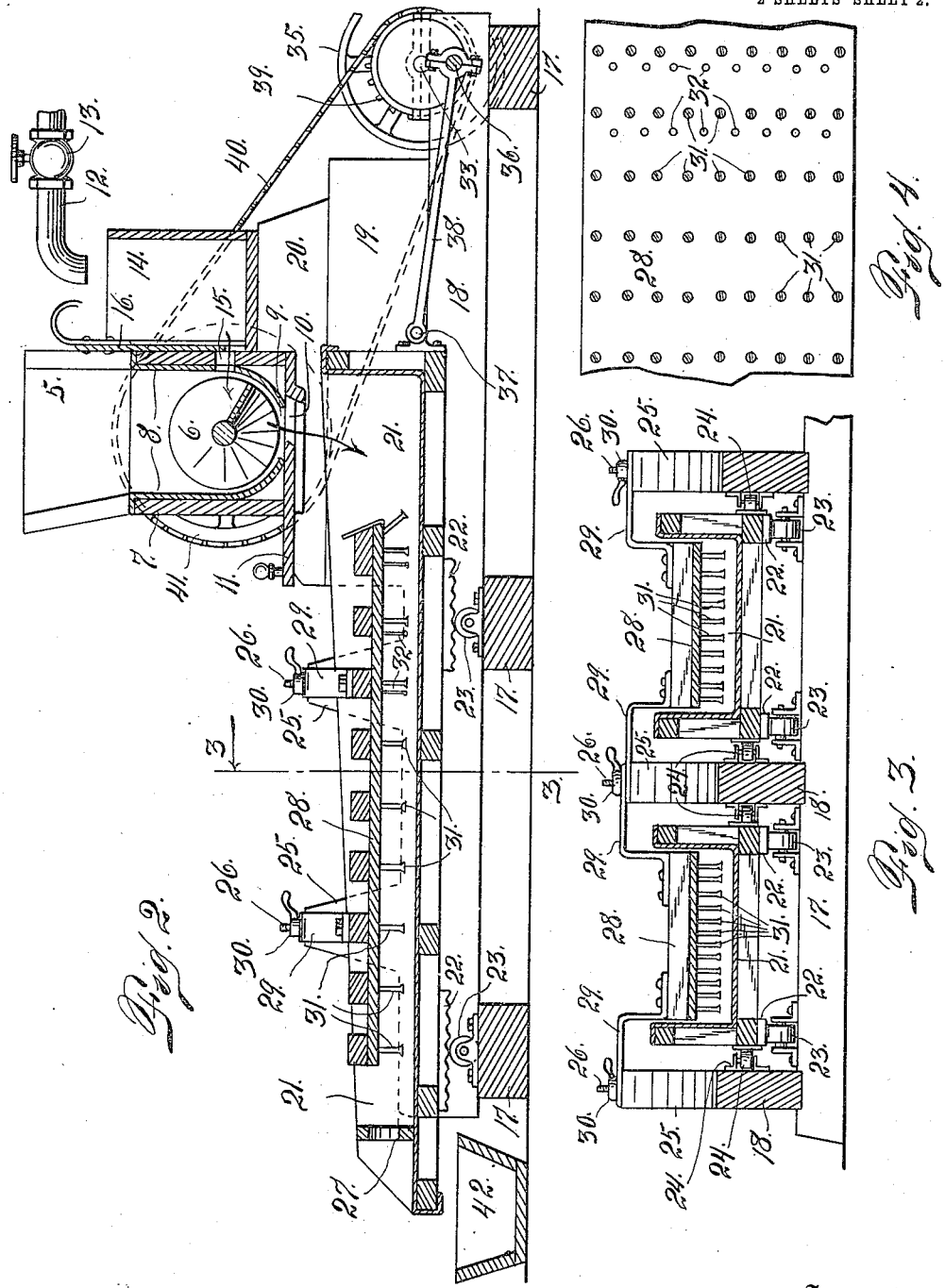

UNITED STATES PATENT OFFICE.

THOMAS F. HARKINS, OF LEADVILLE, COLORADO, ASSIGNOR OF ONE-HALF TO MURDOCK A. NICHOLSON AND ONE-HALF TO ALEXANDER E. FOWLIE, OF LEADVILLE, COLORADO.

PULP-FEEDER.

1,081,737.   Specification of Letters Patent.   Patented Dec. 16, 1913.

Application filed November 25, 1912. Serial No. 733,237.

*To all whom it may concern:*

Be it known that I, THOMAS F. HARKINS, a citizen of the United States, residing at Leadville, county of Lake, and State of Colorado, have invented certain new and useful Improvements in Pulp-Feeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to pulp feeders, and is intended to be used with separators and concentrators of different forms but primarily with machines known as placer machines.

One object of the invention is the provision of means for feeding material evenly from a single trough to a plurality of tables or planes.

Other objects of the invention will appear herinafter as I proceed with the description of that embodiment, which, for the purpose of the present application, I have illustrated in the accompanying drawings, in which:

Figure 1 is a plan view of a machine in which my invention is employed. Fig. 2 is a longitudinal vertical section taken upon the line 2—2, Fig. 1, and looking in the direction of the arrow. Fig. 3 is a vertical transverse section taken on the line 3—3, Fig. 2, and looking in the direction of the arrow. Fig. 4 is an inverted plan view of the stationary platform, forming a part of the machine.

The same reference numerals refer to like parts in each of the views.

In the drawing, I have illustrated, in Fig. 1, a machine including two units, the balance of the machine being broken away, as in practice I propose to use ten units arranged side by side as are the two units illustrated, but it should be understood that the number is not limited, and that it may vary under different conditions.

At one end of the machine is a hopper 5 for reception of the pulp to be treated. A rotatably mounted screw 6 is arranged to move the pulp out of the hopper 5 into and along a feed box 7 which is located above the ends of all of the units. The feed box is provided with a lining 8 preferably of metal, the lining being curved across the bottom of the feed box concentrically with the axis of the screw 6. In the bottom of this lining are openings 9, one for each unit of the machine. Below the openings 9 are openings 10 in the feed box, the size of the latter openings being arranged to be controlled by slides 11.

A water main 12 having a stop-cock 13 therein supplies water to a launder 14 extending alongside the feed box 7 throughout its entire length. Water may be admitted from the launder to the feed box through openings 15, the flow of water being regulated by vertically sliding gates 16.

The substructure of the machine comprises beams 17 laid longitudinally of the machine and having mounted thereon transverse frame bars 18. Blocks 19 and 20 mounted upon the frame bars 18 serve to support the fed box and launder above referred to.

Each unit of my machine consists, partly, of a pan 21 preferably of metal, with a framework of any suitable construction and material. Corrugated bars 22 are attached to the under surface of the pans or their framework, the corrugations being arranged to rest upon rollers 23 which are supported upon the longitudinal beams 17, four such rollers being shown in the drawing for each pan. That all of the bars 22 be corrugated is not essential to the proper working of the machine; and, in fact, the corrugations in all of the bars may be omitted if desired, the reciprocation of the pans being sufficient in some cases, but the preferred construction is as illustrated in the drawing. Other rollers 24 are mounted upon the frame bars 18 and engage the sides of the pan to hold it in proper alinement. At the end of the pan 21 opposite the pulp and water feed, is a waste exit 27 extending substantially the entire width of the pan.

Each frame bar 18 has attached thereto two upright supports 25 equipped at their upper extremities with pins 26. A horizontal stationary platform 28 is supported within each pan by means of angular brackets 29 which have holes therein to fit over the pins 26, hand-nuts 30, or other suitable fastenings being employed to hold the brackets 29 against the top surfaces of the supports 25.

The lower surface of the platform 28 is provided with depending projections 31, preferably screws, in order that the exposed length may be adjusted, these projections being arranged in rows, as clearly illustrated in Fig. 4, or in any other desired manner. In the machine shown in the drawing I have employed auxiliary depending pins 32 near the feed end of the pan where the agitation due to the flow of water is greatest. The projections tend to interrupt the carrying toward the waste exit 27 of the heavier values. This interruption gives the values an opportunity to settle to the bottom of the pan, while the lighter and valueless material finds its way between the depending projections and on toward the waste exit.

A shaft 33 is mounted within bearings 34 secured to the transverse frame bars 18, power being supplied to the shaft through a pulley 35 over which is adapted to run a belt from any suitable power source (not shown). In the shaft, opposite each reciprocating pan 21, is located an eccentric 36. Pivotally connected to the eccentric 36 and to the pan 21 at the point 37 is a connecting rod 38, by means of which reciprocation is communicated to the pan 21. A sprocket wheel 39 fixed upon the shaft 33 transmits motion through a chain 40 to a sprocket wheel 41 whereby the screw 6 is rotated. A trough 42 is arranged beneath the outer ends of the pans 21 to receive the waste material, conveying it to a suitable dumping ground.

From the foregoing description, the operation of my improved placer machine will be obvious.

The material to be treated is dumped into the hopper 5 and carried along the feed box 7 by the rotation of the screw 6, water being simultaneously admitted to the feed box through the openings 15. The amount of material permitted to enter each unit of the machine is regulated by the slide 11. A constant flow of material toward the waste exit end of the pan will be maintained, due to the tendency of water to seek the lowest level. The intensity of the flow in each pan will be controlled by the height of the gate 16 and the consequent amount of water used, there being no incline of the pans to cause any flow. Now as the material encounters the depending projections 31 and 32, the momentum of the heavier particles will be greatly lessened, giving them an opportunity to sink to the bottom of the pan, where they will remain, the water and lighter material flowing over them. Substantially all of the precious metal values will be precipitated to the bottom of the pan before reaching a point two-thirds of the distance toward the waste exit end, the balance of the pan, up to the height of the bottom of the waste exit 27, being filled with black sand and other comparatively heavy material. As soon as the sediment in the bottom of the pans has reached the level of the bottom of the waste exit, the operation of the machine should be discontinued and the pans removed for the "cleaning up."

I claim as my invention:

A feeding apparatus for ore treating mechanism, consisting of a pulp trough provided at regular intervals with exit openings, a feed screw rotatably mounted within said trough and a launder mounted parallel with and adjacent to said trough, said launder being in communication with the trough and adapted to deliver water upon the screw opposite each exit opening.

In testimony whereof, I affix my signature in presence of two witnesses.

THOMAS F. HARKINS.

Witnesses:
Thomas Shelton,
Jos. Heathcock.